(12) United States Patent
Alexander et al.

(10) Patent No.: US 10,255,047 B2
(45) Date of Patent: *Apr. 9, 2019

(54) SOURCE CODE ANALYSIS AND ADJUSTMENT SYSTEM

(71) Applicant: International Business Machines Corporation, Armonk, NY (US)

(72) Inventors: William Alexander, North Kingston, RI (US); Venkatuday M. Balabhadrapatruni, San Jose, CA (US); John C. DelMonaco, Wilmette, IL (US); Gary I. Mazo, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,412

(22) Filed: Nov. 8, 2017

(65) Prior Publication Data

US 2018/0341468 A1 Nov. 29, 2018

Related U.S. Application Data

(63) Continuation of application No. 15/604,815, filed on May 25, 2017.

(51) Int. Cl.
*G06F 9/44* (2018.01)
*G06F 8/41* (2018.01)
*G06F 17/30* (2006.01)
*G06F 8/33* (2018.01)

(52) U.S. Cl.
CPC ............... *G06F 8/427* (2013.01); *G06F 8/33* (2013.01); *G06F 17/30371* (2013.01)

(58) Field of Classification Search
None
See application file for complete search history.

(56) References Cited

U.S. PATENT DOCUMENTS

| 2014/0173563 | A1* | 6/2014 | Dias | G06F 8/36 |
| | | | | 717/123 |
| 2014/0372982 | A1* | 12/2014 | Chan | G06F 8/72 |
| | | | | 717/121 |

OTHER PUBLICATIONS

List of IBM Patents or Patent Applications Treated as Related, Nov. 8, 2017, 2 pages.
U.S. Appl. No. 15/604,815, filed May 25, 2017, Entitled: Source Code Analysis and Adjustment System, First Named Inventor: William Alexander.

* cited by examiner

*Primary Examiner* — Qamrun Nahar
(74) *Attorney, Agent, or Firm* — Cantor Colburn LLP; Teddi Maranzano

(57) ABSTRACT

An aspect includes source code analysis and adjustment. An analysis request is received based on a change detected in a source file. A static analysis of the source file is initiated using a parser to produce a list of named elements and element types based on the source file. Name and pattern recognition is performed by a pattern analyzer based on the list of named elements and element types to identify one or more naming convention inconsistencies in the source file using at least one pattern learned from the source file. A change is suggested to modify at least one named element in the source file based on identifying the one or more naming convention inconsistencies.

6 Claims, 7 Drawing Sheets

SOURCE CODE ANALYSIS AND ADJUSTMENT SYSTEM

DOMESTIC PRIORITY

This application is a continuation of U.S. patent application Ser. No. 15/604,815, filed May 25, 2017, the disclosure of which is incorporated by reference herein in its entirety.

BACKGROUND

The present invention generally relates to computer systems, and more specifically, to a system for source code analysis and adjustment during an editing process.

Source code used to develop complex systems can include thousands of lines of code and is subject to modifications over time. As different developers modify existing source code files, they may follow different practices for partitioning and naming various elements such as data values, data structures, procedure calls, functions, and the like. Some programming languages are more permissive than others in allowing a wide variety of naming options. For example, some programming languages are cases sensitive and others are not. The absence of requiring a fixed naming convention can result in source code that is difficult to maintain, which may lead to oversized and less efficient programs and may increase the risk of software bugs being introduced that reduce computer system performance.

SUMMARY

Embodiments of the present invention are directed to a computer-implemented method for source code analysis and adjustment. A non-limiting example of the computer-implemented method includes receiving an analysis request based on a change detected in a source file. A static analysis of the source file is initiated using a parser to produce a list of named elements and element types based on the source file. Name and pattern recognition is performed by a pattern analyzer based on the list of named elements and element types to identify one or more naming convention inconsistencies in the source file using at least one pattern learned from the source file. A change is suggested to modify at least one named element in the source file based on identifying the one or more naming convention inconsistencies.

Embodiments of the present invention are directed to a system for source code analysis and adjustment. A non-limiting example of the system includes a parser operable perform a static analysis of a source file to produce a list of named elements and element types based on an analysis request responsive to a detected change in the source file. The system also includes a pattern analyzer operable to perform name and pattern recognition based on the list of named elements and element types to identify one or more naming convention inconsistencies in the source file using at least one pattern learned from the source file and suggest a change to modify at least one named element in the source file based on identifying the one or more naming convention inconsistencies.

Embodiments of the invention are directed to a computer program product for source code analysis and adjustment, the computer program product including a computer readable storage medium having program instructions embodied therewith. In a non-limiting example, the program instructions are executable by processing circuitry to cause the processing circuitry to perform receiving an analysis request based on a change detected in a source file. A static analysis of the source file is initiated using a parser to produce a list of named elements and element types based on the source file. Name and pattern recognition is performed by a pattern analyzer based on the list of named elements and element types to identify one or more naming convention inconsistencies in the source file using at least one pattern learned from the source file. A change is suggested to modify at least one named element in the source file based on identifying the one or more naming convention inconsistencies.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
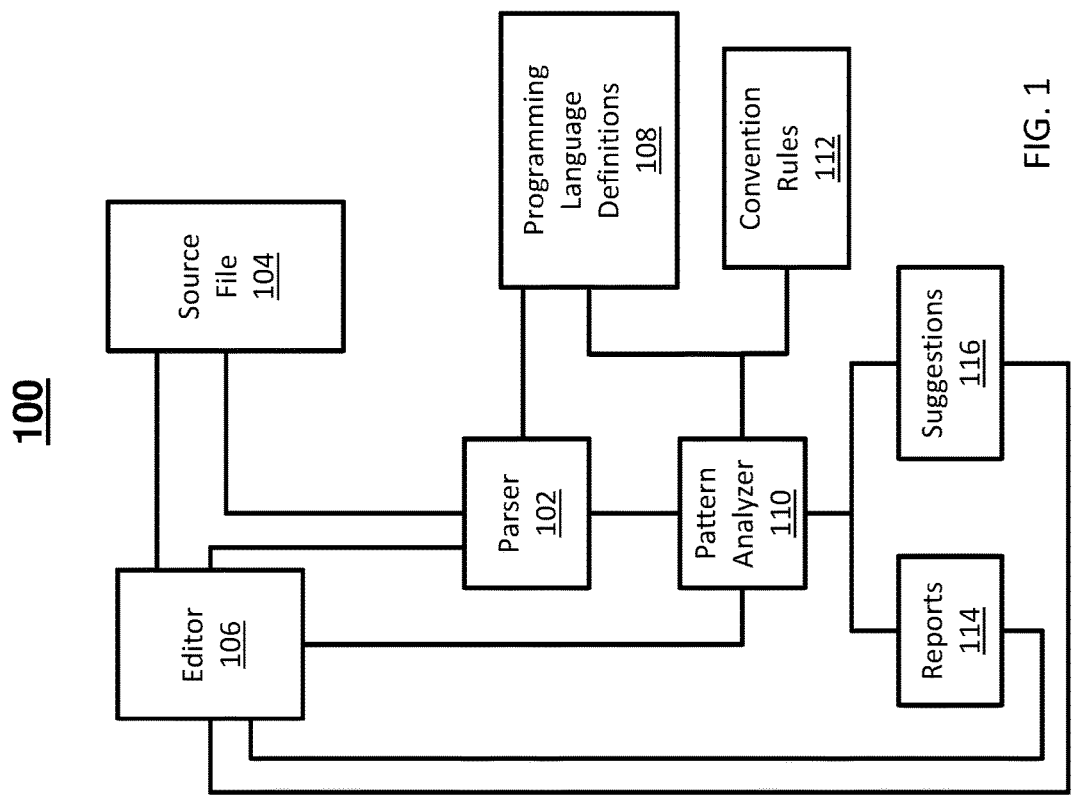
FIG. 1 depicts a system according to one or more embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as source code is maintained and modified over long periods of time, multiple developers can contribute to the source code. Each developer may have an individual style and preferred naming conventions that may not be fully compatible with the existing source code. The variations introduced into the source code can make future updates difficult due to inconsistent use of naming patterns. As the maintainability of the source code is reduced, there can be an increased risk of software bugs being introduced that may diminish computer system performance and efficiency.

Turning now to an overview of the aspects of the invention, one or more embodiments of the invention address the above-described shortcomings of the prior art by applying static analysis and pattern recognition to source code while it is being edited. Static analysis analyzes source code content without actually executing the source code. Pattern analysis can identify similarities in selection, formatting, and grouping of named elements. The pattern analysis results can be presented while the source code is being edited, and suggested name changes can be provided that will increase the overall consistency of named elements within the source code.

The above-described aspects of the invention address the shortcomings of the prior art by applying pattern recognition to named elements in a source file and suggesting name changes responsive to detected changes in the source file. A parser can isolate named elements, and a pattern analyzer can discover existing naming patterns within the source file to establish convention rules. Extracted patterns can be reported and used for scoring potential name changes as increasing or reducing named element consistency within the source file. Technical effects and benefits include detecting naming convention deviations as a source file is being edited and providing modification suggestions to reduce the risk of errors being introduced by the inconsistency with existing patterns.

Turning now to a more detailed description of aspects of the present invention, FIG. 1 depicts an example of a system 100 according to embodiments of the invention. The system 100 includes a parser 102 operable perform a static analysis of a source file 104 to produce a list of named elements and element types based on an analysis request responsive to a detected change in the source file 104. An editor 106 can detect the change in the source file 104, such as creation of a new named element or modification of an existing element within the source file 104. Element types can be, for example, variables, constants, procedures, functions, macros, and various data types as supported by an associated programming language. The editor 106 and parser 102 can support multiple programming languages. Programming language definitions 108 may define syntax rules for compliant element types and rules used to define programming constructs that can be embodied in source file 104 along with other files (not depicted).

While general constraints can be defined in the programming language definitions 108, naming convention patterns of named elements in the source file 104 can be arbitrarily formed by users of the editor 106. When different users modify the source file 104, inconsistencies can be introduced which makes the source file 104 more difficult to maintain by future users and may increase the risk for the introduction of bugs that can reduce computer system performance. In embodiments, the system 100 includes a pattern analyzer 110 operable to perform name and pattern recognition based on the list of named elements and element types from the parser 102 to identify one or more naming convention inconsistencies in the source file 104 using at least one pattern learned from the source file 104. The pattern analyzer 110 can analyze the list of named elements and element types to determine a plurality of naming patterns as a plurality of convention rules 112 for identifying one or more naming convention inconsistencies as further described herein.

The pattern analyzer 110 can also suggest a change to modify at least one named element in the source file 104 based on identifying the one or more naming convention inconsistencies. Suggested changes can be provided in one or more reports 114 and/or one or more suggestions 116 sent to the editor 106 for information and/or acceptance of the change by the user. Reports 114 can indicate portions of the source file 104 that follow an inconsistent naming convention, and the suggestions 116 provide choices to change portions of the source file 104 that do not follow the naming convention. The editor 106 can highlight or otherwise provide indications in an interactive interface for a user to view inconsistencies and determine whether to accept suggested changes. As further changes are made to the source file 104 based on the user accepting changes in the suggestions 116 or making other modifications that do not match the suggestions 116, the pattern analyzer 110 can perform an updated assessment for new patterns and/or new deviations from the convention rules 112.

Figure 2:
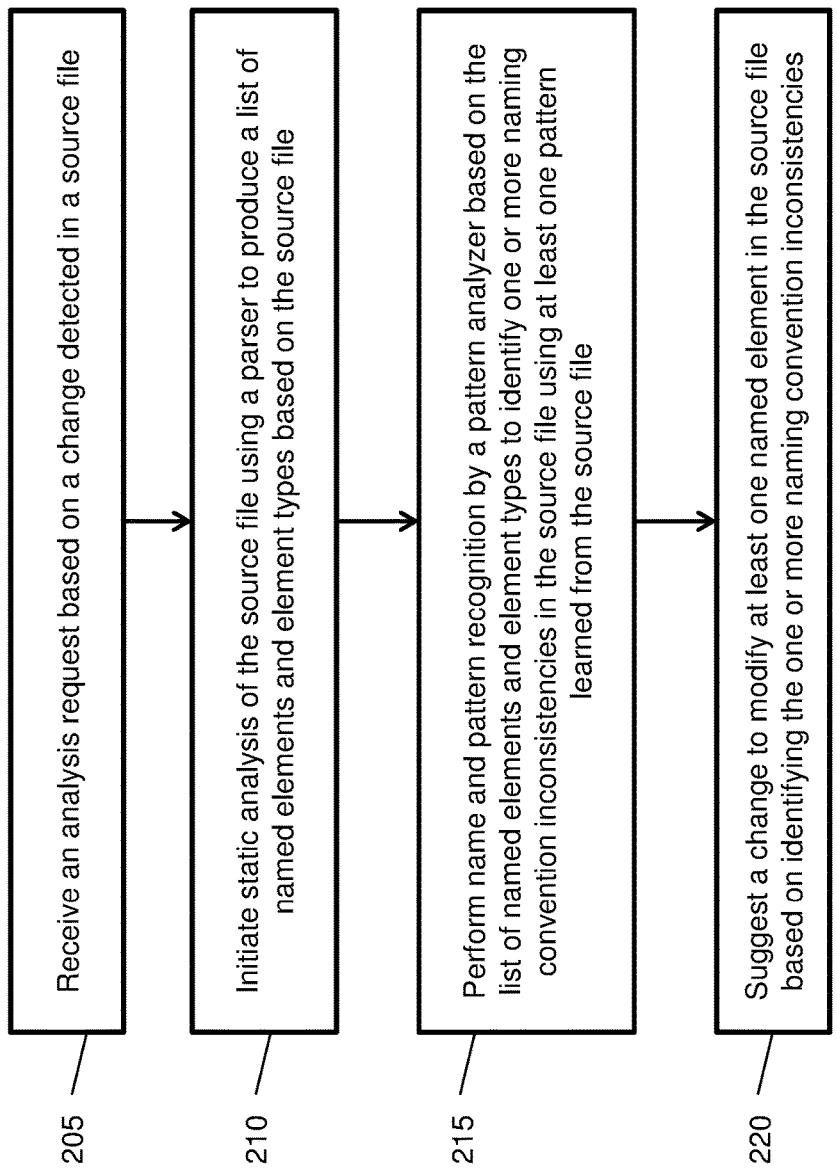
FIG. 2 depicts an example of a process flow for source code analysis and adjustment according to one or more embodiments.

Turning now to FIG. 2, a flow diagram of a process 200 for source code analysis and adjustment is generally shown in accordance with an embodiment. The process 200 is described with reference to FIG. 1 and may include additional steps beyond those depicted in FIG. 2.

At block 205, an analysis request is received based on a change detected in source file 104. The analysis request may be sent by the editor 106 to the parser 102 or from the pattern analyzer 110 to the parser 102 responsive to a change detected through the editor 106, for example.

At block 210, a static analysis of the source file 104 is initiated using the parser 102 to produce a list of named elements and element types based on the source file 104. An example of a list 400 of element types 410 and element names 415 is depicted in a nesting outline 405 in FIG. 4. The nesting outline 405 can assist in grouping of control flow related names during pattern recognition, for instance, to group similar types of procedures and possible sequencing of procedures (e.g., group file operations, sequence "open" before "close", etc.). Further details are provided herein with respect to the example of FIG. 3.

At block 215, name and pattern recognition is performed by pattern analyzer 110 based on the list of named elements and element types to identify one or more naming convention inconsistencies in the source file 104 using at least one pattern learned from the source file 104. At block 220, a change to modify at least one named element in the source file 104 is suggested based on identifying the one or more naming convention inconsistencies. Further details are provided herein with respect to the example of FIG. 5.

Figure 3:
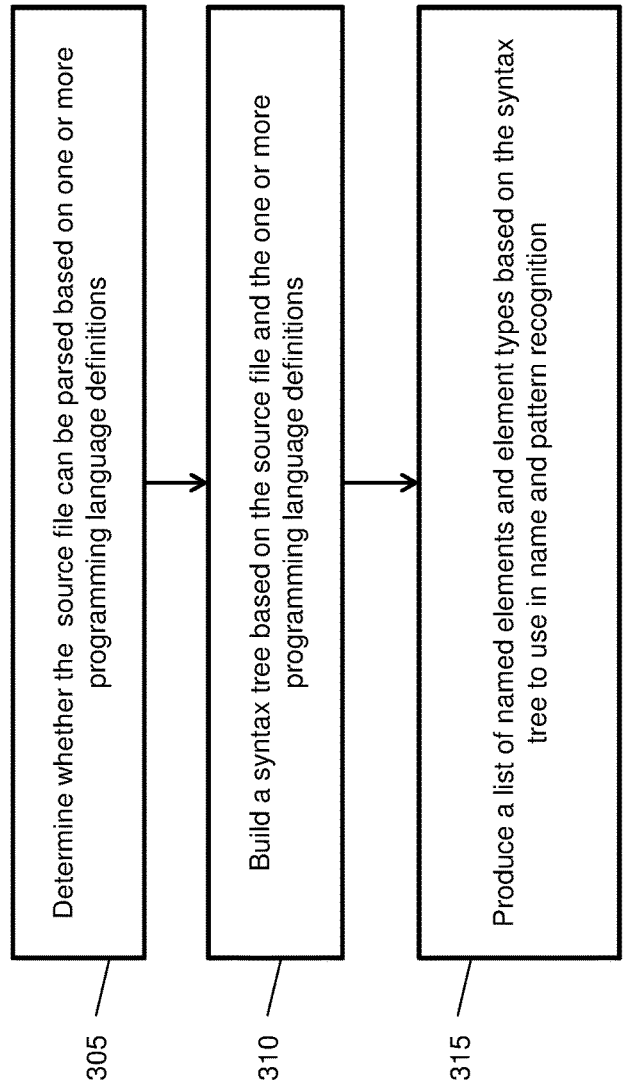
FIG. 3 depicts an example of a process flow for static analysis parsing according to one or more embodiments.

Turning to FIG. 3, a flow diagram of a process 300 for static analysis parsing is generally shown in accordance with an embodiment. The process 300 is described with reference to FIGS. 1-4 and may include additional steps beyond those depicted in FIG. 3.

At block 305, the parser 102 can initially determine whether the source file 104 can be parsed based on one or more programming language definitions 108. For example, if formatting within the source file 104 does not match a known programming language, then further parsing and analysis of the source file 104 can be halted. At block 310, the parser 102 builds a syntax tree based on the source file 104 and the one or more programming language definitions 108. The syntax tree can be constructed using known programming language processing techniques used by compilers to extract programming elements from the source file 104 and identify types and relationship elements of the source file 104. At block 315, the parser 102 produces a list of named elements and element types based on the syntax tree to use in name and pattern recognition, such as the list 400 of element types 410 and element names 415 of FIG. 4.

Figure 4:
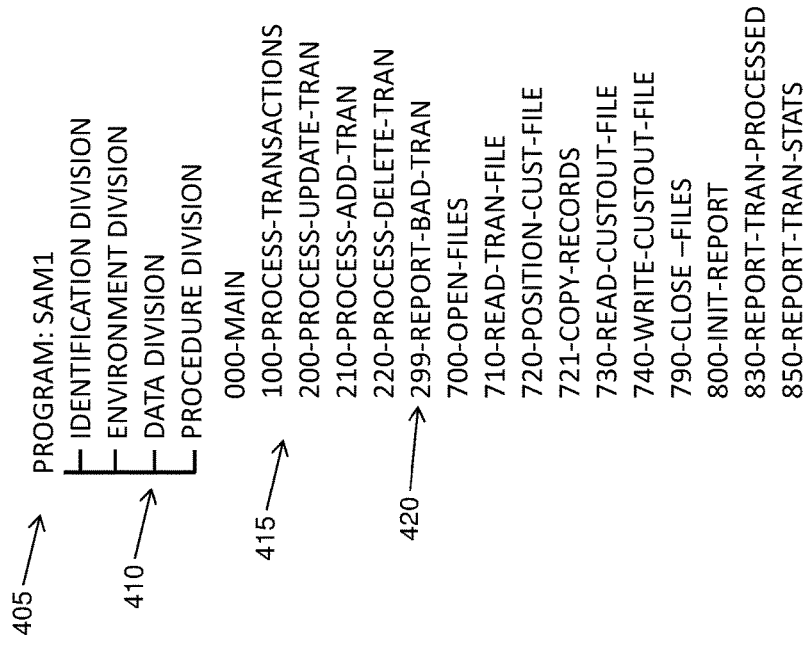
FIG. 4 depicts a nesting outline of a source code file according to one or more embodiments.
Figure 5:
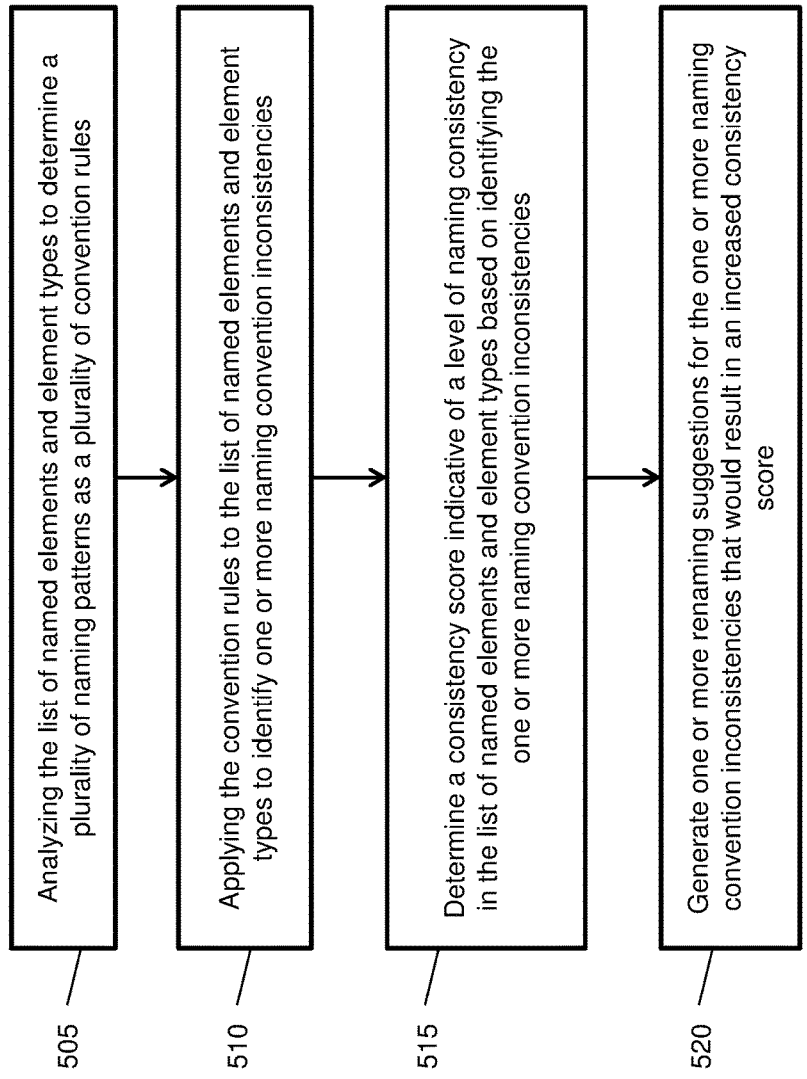
FIG. 5 depicts an example of a process flow for naming and pattern recognition according to one or more embodiments.

Turning to FIG. 5, a flow diagram of a process 500 for naming and pattern recognition is generally shown in accordance with an embodiment. The process 500 is described with reference to FIGS. 1-4 and may include additional steps beyond those depicted in FIG. 5.

At block 505, the pattern analyzer 110 analyzes the list 400 of named elements 415 and element types 410 from the parser 102 to determine a plurality of naming patterns as a plurality of convention rules 112. At block 510, the pattern analyzer 110 applies the convention rules 112 to the list 400 of named elements 415 and element types 410 to identify one or more naming convention inconsistencies, such as naming inconsistency 420. At block 515, the pattern analyzer 110 determines a consistency score indicative of a level of naming consistency in the list 400 of named elements 415 and element types 410 based on identifying the one or more naming convention inconsistencies. At block 520, the pattern analyzer 110 generates one or more renaming suggestions, such as suggestions 116, for the one or more naming convention inconsistencies that would result in an increased consistency score.

As an example, in the COBOL language, the pattern analyzer 110 can search the source file 104 of FIG. 1 for patterns related to exit paragraph names such as ending with "-EXIT", paragraph names starting with numeric prefixes (e.g., 100-, 210-, 320-, etc.), section names ending with a suffix such as "-SN", paragraphs that are copied into the PROCEDURE DIVISION ending with a suffix such as "-RTN", and the like. A naming scheme can map numerical ranges to specific function types. For instance, in the example of FIG. 4, the 100- and 200-groups are used for paragraphs that process transactions, the 700-group is for file access, and the 800-group is for reporting. The functions may not be determined automatically by the pattern analyzer 110; however, the nesting outline 405 can provide hints by the number of invocations. A naming inconsistency 420 can be identified as a 299-REPORT-BAD-TRANS paragraph that should be in the 700-group that handles multiple-referenced functions.

In embodiments, the pattern analyzer 110 can determine convention rules 112 determined as a plurality of regular expression formats derived using one or more of alphanumeric pattern detection, punctuation placement detection, and similar word detection. Alphanumeric pattern detection can search for numerical patterns and/or patterns of letters. Punctuation placement detection can search for hyphens or other special character placement patterns. Similar word detection can search for patterns using words that vary in spelling, abbreviations, plural form, and/or have a similar meaning (e.g., using a thesaurus function). For example, if a paragraph was added without using a numeric prefix, such as CALCULATE-TOTAL-TRANS, then this paragraph would fall outside of the naming scheme used by the program in source file 104. This would be reported in reports 114. Changing such a paragraph name to 1xx-CALCULATE-TOTAL-TRANS (or 2xx- or 8xx-) would improve the consistency with respect to other existing named elements in the source file 104, and a corresponding list of possible changes can be included in the suggestions 116. If more than one reference to 1xx-CALCULATE-TOTAL-TRANS was added to the source file 104, the convention rules 112 may indicate that a 7xx- prefix is needed for consistency.

A consistency score can be determined for regular expression formats applied against the list of named elements and element types to determine a number of matches for each pattern expressed by the regular expression formats. The consistency score can be included in the reports 114 and/or with suggestions 116 to indicate where larger degrees of inconsistency exist and the potential consistency score improvement associated with each option in the suggestions 116. In some embodiments, when the changes made to the source file 104 through the editor 106 result in a reduced consistency score, the reports 114 and/or suggestions 116 are triggered to notify the user of the reduction and provide an option to make a change while the user is actively editing the source file 104 through the editor 106.

In the example of FIG. 4, the analysis of the element names 415 can result in the pattern analyzer 110 identifying regular expression formats of "1[0-9][0-9]-PROCESS-[A-Z]+" and "[0-9][0-9][0-9]-PROCESS-[A-Z]+" for named elements: "100-PROCESS-TRANSACTIONS", "200-PROCESS-UPDATE-TRAN", "210-PROCESS-ADD-TRAN", and "220-PROCESS-DELETE-TRAN". Additional regular expression format variations are provided in the example of table 1, where the highest consistency score of four indicates a greater degree of matching for more detailed patterns in the group.

TABLE 1

Regular Expression Format examples

| # | Regular Expression Format | Consistency Score |
|---|---|---|
| 1 | 2[0-9]0-PROCESS-[A-Z]+-TRAN | 4 |
| 2 | 2[0-9]0-PROCESS-[A-Z]+ | 3 |
| 3 | [0-9][0-9]0-PROCESS-[A-Z]+ | 2 |
| 4 | [0-9][0-9][0-9]-PROCESS-[A-Z]+ | 1 |

Figure 6:
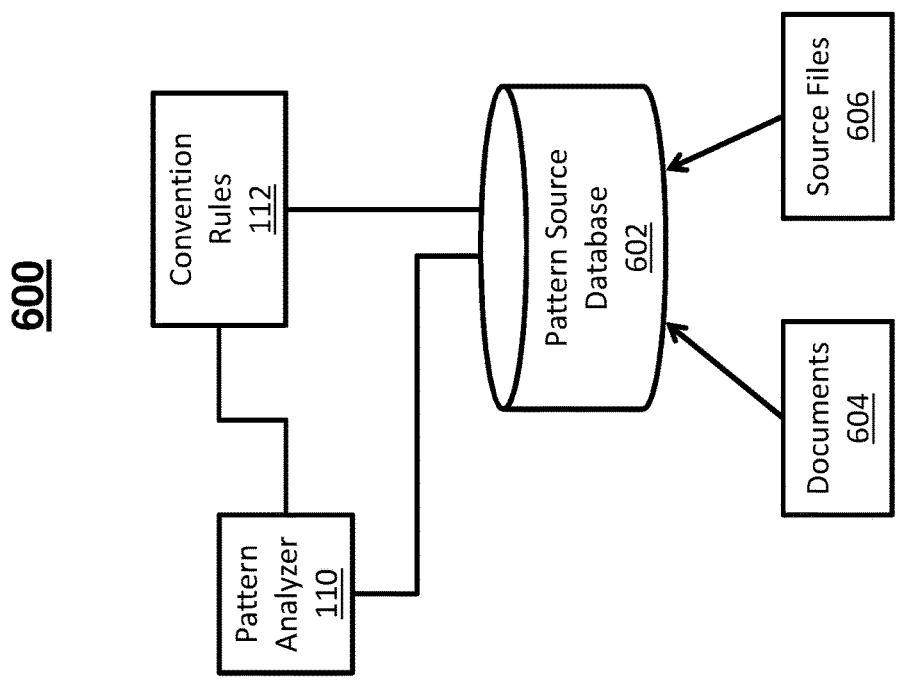
FIG. 6 depicts a convention rules training enhancement system according to one or more embodiments.

FIG. 6 depicts a convention rules training enhancement system 600 according to embodiments. As previously described, the convention rules 112 can be populated by the pattern analyzer 110 based on the contents of text within the source file 104 of FIG. 1. Convention rules 112 can also be supplemented with additional learning sources to apply organizational standards developed over multiple source files 606 and/or captured in various documents 604, such as style guidelines, to ensure consistency is maintained across multiple projects. Regular expression formats can be learned by the pattern analyzer 110 based on a combination of a pattern source database 602 and the list of named elements and element types from the parser 102 of FIG. 1. The pattern source database 602 can collect a plurality of patterns extracted from one or more documents 604 and/or one or more other source files 606. The pattern source database 602 can track the source of data used in constructing the convention rules 112. In some embodiments, the pattern source database 602 can be configured with weight values for different sources to give a higher weighting, for example, to data extracted from particular sources in developing patterns and establishing the consistency score criteria.

Figure 7:
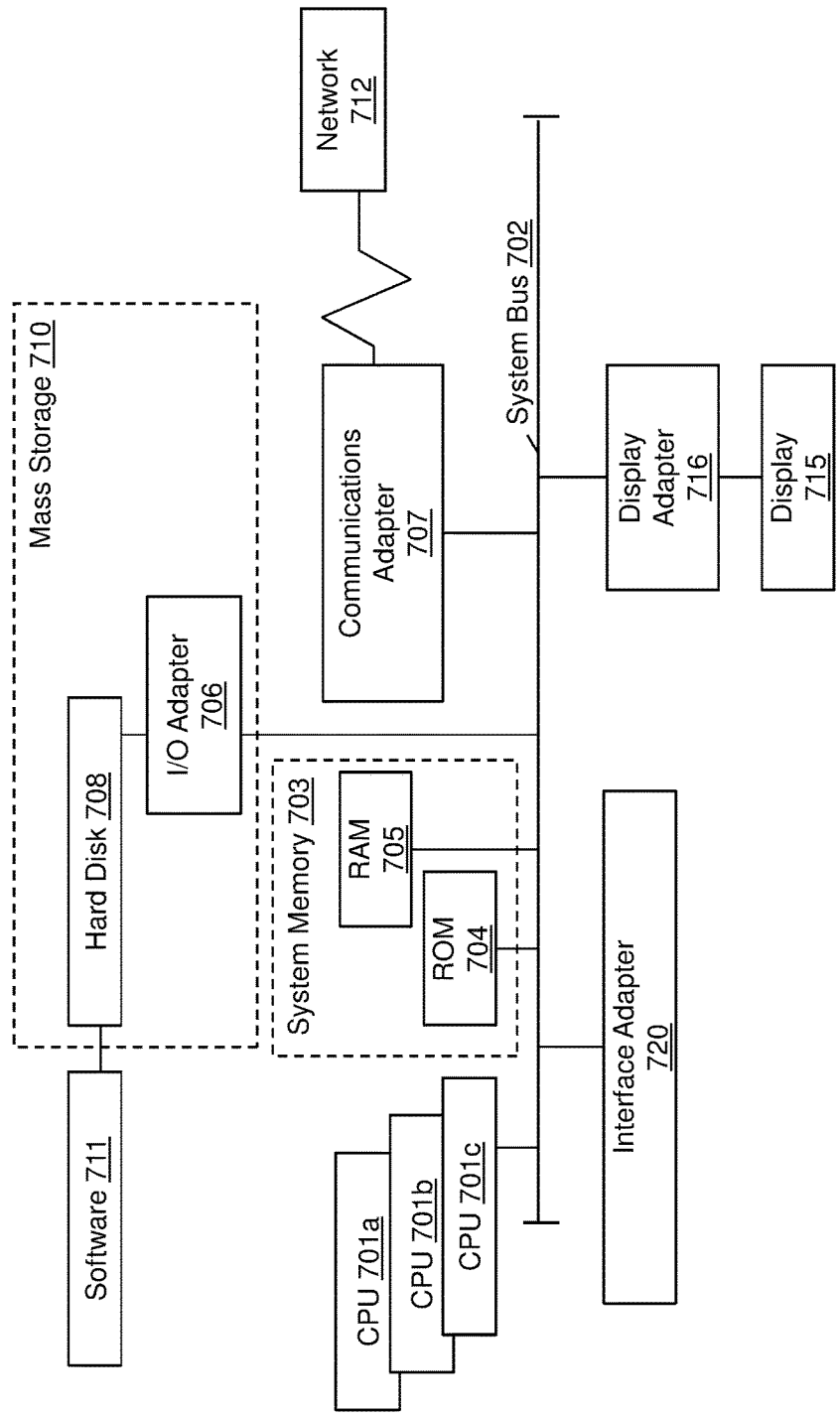
FIG. 7 depicts a processing system in accordance with one or more embodiments.

Referring now to FIG. 7, there is shown an embodiment of a processing system 700 for implementing the teachings herein. In this embodiment, the processing system 700 has one or more central processing units (processors) 701a, 701b, 701c, etc. (collectively or generically referred to as processor(s) 701). The processors 701, also referred to as processing circuits/circuitry, are coupled via a system bus 702 to a system memory 703 and various other components. The system memory 703 can include read only memory (ROM) 704 and random access memory (RAM) 705. The ROM 704 is coupled to system bus 702 and may include a basic input/output system (BIOS), which controls certain basic functions of the processing system 700. RAM 705 is read-write memory coupled to system bus 702 for use by the processors 701.

FIG. 7 further depicts an input/output (I/O) adapter 706 and a communications adapter 707 coupled to the system bus 702. I/O adapter 706 may be a small computer system interface (SCSI) adapter that communicates with a hard disk 708 and/or any other similar component. I/O adapter 706 and hard disk 708 are collectively referred to herein as mass storage 710. Software 711 for execution on the processing system 700 may be stored in mass storage 710. The mass storage 710 is an example of a tangible storage medium readable by the processors 701, where the software 711 is stored as instructions for execution by the processors 701 to perform a method, such as the processes 200, 300, and 500 of FIGS. 2, 3 and 5. Communications adapter 707 interconnects the system bus 702 with an outside network 712 enabling processing system 700 to communicate with other such systems. A display 715 is connected to system bus 702 via a display adapter 716, which may include a graphics controller to improve the performance of graphics intensive applications and a video controller. In one embodiment, adapters 706, 707, and 716 may be connected to one or more I/O buses that are connected to the system bus 702 via an intermediate bus bridge (not shown). Suitable I/O buses for connecting peripheral devices such as hard disk controllers, network adapters, and graphics adapters typically include common protocols, such as PCI. Additional input/output devices can be connected to the system bus 702 via an interface adapter 720 and the display adapter 716. A keyboard, a mouse, and/or a speaker can be interconnected to the system bus 702 via the interface adapter 720, which may include, for example, a Super I/O chip integrating multiple device adapters into a single integrated circuit.

Thus, as configured in FIG. 7, the processing system 700 includes processing capability in the form of processors 701, and, storage capability including the system memory 703 and the mass storage 710, input means such as keyboard and mouse, and output capability including speaker and the display 715. In one embodiment, a portion of the system memory 703 and the mass storage 710 collectively store an operating system, such as the z/OS or AIX operating system from IBM Corporation, to coordinate the functions of the various components shown in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for source code analysis and adjustment, the computer-implemented method comprising:

receiving, at a processing system comprising one or more processors and memory, an analysis request based on a change detected in a source file;

initiating, by the processing system, a static analysis of the source file using a parser to produce a list of named elements and element types based on the source file;

performing name and pattern recognition by a pattern analyzer of the processing system based on the list of named elements and element types to identify one or more naming convention inconsistencies in the source file using at least one pattern learned from the source file, wherein the name and pattern recognition comprises:

analyzing the list of named elements and element types to determine a plurality of naming patterns as a plurality of convention rules;

applying the convention rules to the list of named elements and element types to identify one or more naming convention inconsistencies;

determining a consistency score indicative of a level of naming consistency in the list of named elements and element types based on identifying the one or more naming convention inconsistencies; and generating one or more renaming suggestions for the one or more naming convention inconsistencies that result in an increased consistency score;

suggesting a change to modify at least one named element in the source file based on identifying the one or more naming convention inconsistencies and generating the one or more renaming suggestions; and performing, by the processing system, the change to modify the at least one named element responsive to a user accepting at least one of the one or more renaming suggestions.

2. The computer-implemented method of claim 1, further comprising:

determining whether the source file can be parsed based on one or more programming language definitions;

building a syntax tree based on the source file and the one or more programming language definitions; and producing the list of named elements and element types based on the syntax tree to use in name and pattern recognition.

3. The computer-implemented method of claim 2, wherein the list of named elements and element types is formatted as a nesting outline to assist in grouping of control flow related names during pattern recognition.

4. The computer-implemented method of claim 1, wherein the convention rules are determined as a plurality of regular expression formats derived using one or more of: alphanumeric pattern detection, punctuation placement detection, and similar word detection.

5. The computer-implemented method of claim 4, wherein further comprising:

learning the regular expression formats based on a combination of a pattern source database and the list of named elements and element types, wherein the pattern source database collects a plurality of patterns extracted from one or more documents and/or one or more other source files.

6. The computer-implemented method of claim 4, wherein the consistency score is determined for the regular expression formats applied against the list of named elements and element types to determine a number of matches for each pattern expressed by the regular expression formats.

* * * * *